United States Patent
Luong et al.

(10) Patent No.: US 12,332,853 B2
(45) Date of Patent: Jun. 17, 2025

(54) TECHNIQUES FOR SAFE DATABASE MIGRATION WITH NO DOWNTIME

(71) Applicant: Oracle International Corporation, Redwood Shores, CA (US)

(72) Inventors: Duc Trong Luong, Bellevue, WA (US); Xuekun Kou, Issaquah, WA (US); Calvin Alexander Loncaric, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 883 days.

(21) Appl. No.: 17/357,578

(22) Filed: Jun. 24, 2021

(65) Prior Publication Data

US 2022/0414069 A1   Dec. 29, 2022

(51) Int. Cl.
*G06F 16/00* (2019.01)
*G06F 16/21* (2019.01)
*G06F 16/23* (2019.01)
*G06F 16/27* (2019.01)

(52) U.S. Cl.
CPC ........ *G06F 16/214* (2019.01); *G06F 16/2358* (2019.01); *G06F 16/2379* (2019.01); *G06F 16/27* (2019.01)

(58) Field of Classification Search
CPC .... G06F 16/214; G06F 16/27; G06F 16/2379; G06F 16/2358; G06F 3/067; G06F 8/71; G06F 11/142; G06F 16/125; G06F 16/13; G06F 16/148; G06F 16/21; G06F 16/285; G06F 3/061; G06F 8/65
See application file for complete search history.

(56) References Cited

U.S. PATENT DOCUMENTS

| | | | |
|---|---|---|---|
| 2004/0078569 A1* | 4/2004 | Hotti | G06F 21/6227 713/165 |
| 2020/0050386 A1* | 2/2020 | Natarajan | H04L 63/123 |
| 2021/0072917 A1* | 3/2021 | Surla | G06F 3/0683 |
| 2021/0349863 A1* | 11/2021 | Dani | G06F 16/2343 |
| 2022/0116475 A1* | 4/2022 | Boshev | G06F 9/545 |
| 2022/0382742 A1* | 12/2022 | Procek | G06F 9/4881 |

FOREIGN PATENT DOCUMENTS

| | | |
|---|---|---|
| EP | 3686751 A1 | 7/2020 |
| WO | 2020177850 A1 | 9/2020 |

* cited by examiner

*Primary Examiner* — Shyue Jiunn Hwa
(74) *Attorney, Agent, or Firm* — Invoke

(57) ABSTRACT

Techniques for enabling efficient data migration between data stores with no downtime are disclosed. A distributed computing system can be implemented with an initial data store and a target data store. During the migration of a portion of the data from the initial data store to the target data store, the distributed computing system can receive requests to create data entities or launch workflow instances at the data stores. The system can determine whether the initial data store or the target data store has been designated the primary data store for handling the requests. The system can also determine whether the initial data store or the target data store contain a key associated with the request. If the key is present in either of the data stores, the system may abort the creation of the data entity.

18 Claims, 12 Drawing Sheets

TECHNIQUES FOR SAFE DATABASE MIGRATION WITH NO DOWNTIME

SUMMARY

Cloud-based services provide solutions for processing tasks in which the tasks may result in data stored or updated in a data store or database via a transaction. In a multi-tenant distributed computing system, customer data may be migrated from one data store to another as the requirements of the data storage backend change. Migrating customer data traditionally incurs a downtime cost representing functionality loss of customer processes during the time when the computing environment transitions from an initial data store to a target data store. Therefore, there exists a need for improved techniques for migrating data from one data store to another while preserving the function of customer processes.

BRIEF DESCRIPTION

Embodiments of the present disclosure relate to providing database migration with no downtime. A database migration that occurs with no downtime can preserve the functionality of a user's interaction with the databases before, during, and after the migration, such that the user may not experience a loss of functionality while the migration is in progress. In particular, some embodiments of the present disclosure describe methods for migrating a portion of the data from one database to another instead of all the data.

Some embodiments provide methods for implementing an initial data store and a target data store within a distributed computing system. The data stores may be databases or other data storage systems. The data stores can be of several different types, including NoSQL (including key-value), relational, and multi-modal. The distributed computing system can be configured to provide workflow services or other application services. For the embodiments that correspond to workflow, the distributed computing system may include workflow as a service (WFaaS) among a suite of cloud services available to users/customers of the distributed computing system. Because workflow services can handle a large number of requests for transactions at the data stores both before and during data migration, the techniques disclosed herein can address appropriate handling of customer requests, such as workflow launches or queries. A workflow can include a series of tasks or other operations to be executed to process workflow instance data.

One embodiment is directed to a method performed by a distributed computing system. The method can include implementing the initial data store and the target data store. The initial data store can have an initial store status, which may be open or closed. Similarly, the target data store can have a target store status that may be open or closed. One data store is designated as primary. The initial data store can be configured to store data associated with a user (e.g., customer, tenant, etc.) of the initial data store. A portion of the data can be migrated from the initial data store to the target data store. Migrating the portion of the data can include replicating the portion of the data from the initial data store to the target data store, changing the initial store status, changing the target store status, and changing the designated primary.

While the portion of the data is being migrated, the distributed computing system can receive a customer request that entails creating a new data entity (e.g., a first data entity). Creating a data entity may also be referred to as launching an instance (e.g., a workflow instance), so that the customer request may be referred to as a launch request. Creating the first data entity may include one or more transactions with a data store. The request can include a key which may uniquely identify the request and/or other attributes. The distributed computing system can determine that the initial data store is designated as the primary data store and is therefore the appropriate data store to associate with the launch request and transaction. The distributed computing system (e.g., a scheduler or other process of the distributed computing system) can also determine that the initial store status is open. If the store status is open, the target data store is checked for the presence of the key associated with the request. The key may be stored as part of the launch transaction of the first data entity; the presence of a key in a data store indicates that a data entity with an identical key has already been launched at that data store. To ensure that no instances with the same key are launched during the migration process, the distributed computing system can verify that the key is not present in the target data store (in addition to verifying that it is not present in the initial data store). If the key is not present, the first data entity may be created at the initial data store. A transaction for creating the first data entity may include committing the first data entity to the initial data store or aborting the transaction.

In another embodiment, the method may include additional operations to handle launch requests that occur later in the migration process. The target data store may be designated the primary store. The distributed computing system can receive a second request to create a second data entity associated with a second key. The distributed computing system may then determine that the target data store is designated as the primary, determine the target store status, and verify that the second key is not present in the initial data store. Based on these determinations (e.g., the target store status is open), the distributed computing system may create the second data entity at the target data sore.

In some embodiments, the user data stored at the initial data store can include immutable data, transient data, and key data. Immutable data can be data that is created within the data store that may be read but not updated or deleted. When migrating the first and second portions of the data between the initial data store and the target data store, the portions of the data can include immutable data.

In another embodiment, the method may include additional operations to handle rolling back a data migration after a portion of the data has been replicated from the initial data store to the target data store. The cloud service (e.g., WFaaS) may create new immutable data in the target data store during a migration (e.g., the second data entity may include new immutable data). The initial data store can be designated as the primary store. A second portion of the data can be transferred from the target data store to the initial data store. The second portion of the data can include the new immutable data created by the cloud service. During this transfer, the distributed computing system can receive a third request to create a third data entity. The third request can include a third key. The distributed computing system can then determine that the initial data store is designated as the primary store, the initial store status is open, and that the third key is not present in the target data store. The distributed computing system can then create the third data entity at the initial data store.

In some other embodiments, the method includes an operation to ensure that the initial store status is open prior to committing a transaction to the initial data store. The transaction may result in creating key and immutable data in the data store, the data associated with the creation of the first and second data entities.

Another embodiment is directed to a distributed computing system including one or more processors and one or more memories storing computer executable instruction that, when executed with the one or more processors, cause the distributed computing system to implement an initial data store and a target data store. The distributed computing system can designate the initial data store as the primary store. The instructions can cause the distributed computing system to migrate a portion of the data from the initial data store to the target data store. While the data is migrating (e.g., by replication), the distributed computing system may receive a request to create a first data entity at the initial data store. The request can include a key which may uniquely identify the request, the first data entity, the first data entity's scope, or other attributes of the request. The instructions can cause the distributed computing system to determine that the initial data store is designated as the primary data store and is therefore the appropriate data store to associate with the launch request and transaction. The instructions can also cause the distributed computing system to determine that the initial store status is open. If the store status is open, the target data store is checked for the presence of the key associated with the request. If the key is not present, the distributed computing system stores the first data entity at the initial data store. A transaction for creating the first data entity may include committing the first data entity to the initial data store or aborting the transaction.

In yet another embodiment, the instructions may cause the distributed computing system to handle launch requests that occur later in the migration process. The target data store may be designated the primary store. The distributed computing system can receive a second request to create a second data entity associated with a second key. The instructions may cause the computing system to then determine that the target data store is designated as the primary, determine the target store status, and verify that the second key is not present in the initial data store. Based on these determinations (e.g., that the target store status is open), the system may create the second data entity at the target data sore.

In another embodiment, the instructions may allow the distributed computing system to handle rolling back a data migration after a portion of the data has been replicated from the initial data store to the target data store. The second data entity may include new immutable data in the target data store. The initial data store can be designated as the primary store. The instructions may cause the distributed computing system to transfer a second portion of the data from the target data store to the initial data store. During this transfer, the distributed computing system can receive a third request to create a third data entity. The third request can include a third key. The instructions can cause the distributed computing system to determine that the initial data store is designated as the primary store, that the initial store status is open, and that the third key is not present in the target data store. The computing system can then create the third data entity at the initial data store.

Still another embodiment is directed to a non-transitory computer-readable medium storing specific computer-executable instructions that, when executed by a processor, cause a computer system to at least: implement an initial data store and a target data store; migrate a portion of the data from the initial data store to the target data store; while the data is migrating, receive a request to create a first data entity at the initial data store; determine that the initial data store is designated as the primary data store; determine that the initial store status is open; verify the presence of the key associated with the request at the target data store; and contingent upon the determination that the key is not present, create the first data entity at the initial data store. A transaction for creating the first data entity may include committing the first data entity to the initial data store or aborting the transaction.

In some embodiments, the instructions may cause the distributed computing system to: designate the target data store as the primary store; receive a second request to create a second data entity associated with a second key; determine that the target data store is designated as the primary, determine the target store status, verify that the second key is not present in the initial data store; and, contingent upon these determinations, create the second data entity at the target data sore.

In another embodiment, the instructions may cause the distributed computing system to: create new immutable data in the target data store; designate the initial data store as the primary store; transfer a second portion of the data from the target data store to the initial data store; and during this transfer, receive a third request to create a third data entity. The third request can include a third key. The instructions can additionally cause the distributed computing system to: determine that the initial data store is designated as the primary store, determine the initial store status, verify that the third key is not present in the target data store; and create the third data entity at the initial data store.

DETAILED DESCRIPTION

Figure 1:
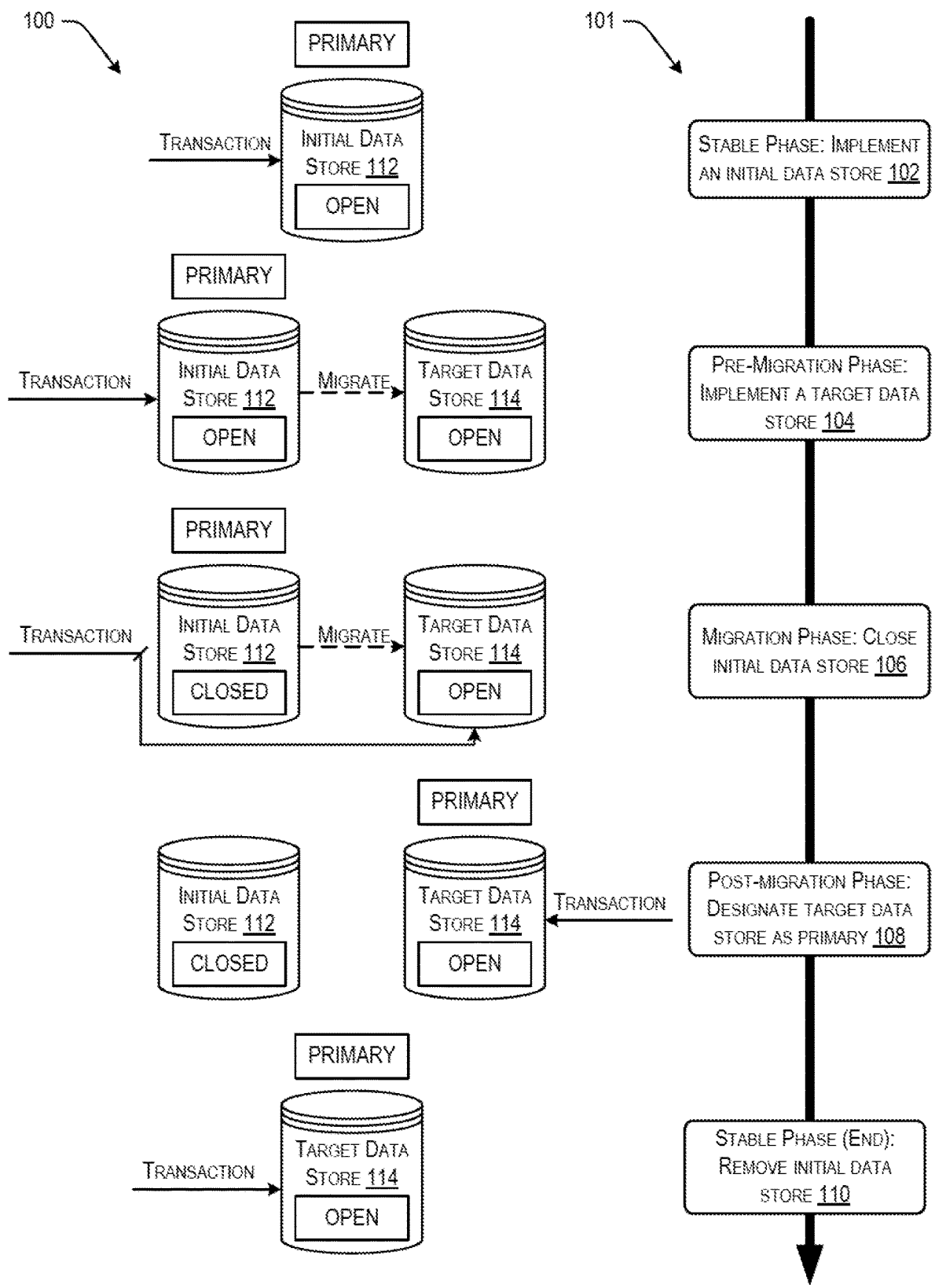
FIG. 1 is a simplified block diagram and associated flow chart of an example process to migrate data from an initial data store to a target data store, according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive.

The techniques described herein make reference to workflow-as-a-service (WFaaS), in which workflow processing tasks (also referred to as workflow instances) may be distributed to one or more workers (e.g., client devices, worker processes, worker threads, or the like) hosted within a distributed computing system (e.g., a client/server environment, a cloud computing environment, or the like). However, the techniques may also apply to other computing applications that may transact with one or more data stores to create data entities. A distributed computing system may include any suitable number of computing instances (e.g., computing nodes, virtual machines, virtualized containers, hosts, or other suitable physical or virtual computing resources) that perform operations to execute the workflow instances or other operations of the workflow service. A workflow instance may be associated with the creation of one or more data entities. A data entity can include data associated with the workflow instance. After a workflow instance has been launched by creating one or more data entities, the workers can execute code (e.g., customer-written code described by workflow instance data). The result of the workflow instance can be updating the workflow instance data, which may include creating or modifying the one or more data entities.

Workflow instances may be launched by a request (e.g., a customer request). Such a request may be agnostic to the underlying configuration of the data store(s) of the distributed computing system. For example, a customer request may include information to launch a workflow instance without specifying a particular data store or database to be used by the distributed computing system. The request can include key data, which may include a key value and a scope. The key data may be idempotent, such that the key data can be used to guarantee uniqueness of the workflow instance for a key that is in scope. That is to say, only one workflow instance corresponding to a key may exist at one time.

In addition to launching workflow instances, customers may also request that WFaaS store certain kinds of immutable data. Immutable data can include workflow definitions. Immutable data can be associated with a workflow instance and once created, may not be updated or deleted by the associated workflow instance or by other instances. Immutable data may be used by subsequent instances or other transactions to the data store, and so may persist. Workflow instances may also be associated with the creation of transient data, which can include data corresponding to the task or tasks of the workflow instance. Transient data can also include a lease for the workflow instance or assignment data (e.g., historical assignment). The transient data can be created and updated within the lifespan of a specific workflow instance. After the workflow instance associated with the transient data ends, the transient data may no longer be required by any other workflow processes. Transient data may be scheduled to be deleted from the data store after a set period of time as part of a garbage collection or other process to maintain the data store.

The data associated with the workflow instances may persist in a data store, database, or other storage system. The data stores may be any of a variety of data stores, for example, a relational database, a key-value database, another NoSQL database, a multimodal database, or other database. The data stores can be configured as pluggable databases (PDB), which are containers within a larger data store. In a distributed computing system, changes to the data storage requirements (e.g., scalability requirements, a customer requiring a dedicated data store, addition of storage infrastructure, storage load balancing, etc.) of tenants and applications may necessitate a migration of data from one data store to another. For example, the data described above may persist in a key-value database. A migration to another, target database (e.g., a multimodal database) may be desired. To ensure that customers experience no downtime during the migration, the computing environment can incorporate additional logic to handle customer requests that may result in transactions with the initial data store or the target data store. In this way, the customer requests can remain agnostic to the state of the distributed computing system and the implemented data stores during the migration. In other words, customer requests can, from the customers' perspective, function in the same way before, during, and after data migration occurs, resulting in no downtime.

Continuing the WFaaS example from above, migrating a WFaaS customer from one data store to another can include replicating a portion of the data from an initial data store to a target data store. Since workflow transient data may only be needed by a workflow instance during the lifetime of that instance, the migration may omit that data from the transfer. That is to say, the migration may only replicate immutable data from the initial data store to the target data store. Transient data created in the initial data store may eventually drain from the initial data store during garbage collection processes after the associated workflow instance ends.

Customers can request to launch new workflow instances throughout the migration process. As mentioned above, the customer requests may be agnostic to the configuration of the data stores of the distributed computing system. Once the immutable data from the initial data store has been replicated to the target data store, a transition can occur to designate the target data store as the primary data store for which newly launched workflow instances can transact. Since key data may not be replicated at the target data store, newly launched workflow instances at the target data store may include a key that is not currently in the target data store but may be in the initial data store. Because WFaaS enforces uniqueness of workflow instance keys (e.g., singleton keys), the launch logic for the workflow instance can cause the distributed computing system to check for the existence of the key in the initial data store. If the key is stored at the initial data store, then the launch request will create a conflict, since an identical workflow instance is already in existence at the initial data store. The distributed computing system can then reject the workflow instance launch request.

Most workflow instances can have relatively short lifetimes, such that the workflow instance will not live beyond the time required to transition from the initial data store to the target data store. Some workflow instances, however, can have relatively long lifetimes. In either case, a workflow instance launched at the initial data store may have associated processes that transact with the initial data store for the lifetime of the workflow instance. Similarly, a workflow instance launched with the target data store may have associated processes that transact with the target data store for the lifetime of the workflow instance. Thus, after transitioning to the target data store, the distributed computing system hosting the workflow processes can continue to maintain both data stores until the all the transient data stored in the initial data store reaches the end of its lifetime.

Prior to the transition from the initial data store to the target data store, customers can request that the distributed computing system (e.g., a cloud service, WFaaS, etc.) create new immutable data (e.g., creating a new workflow definition). If the initial data store is still the primary store and receives the launched workflow instance, the new immutable data can be created in both the initial data store and the target data store, to ensure that this new immutable data is replicated in both data stores.

Numerous advantages are achieved by the techniques described herein. Traditional methods for providing zero downtime database migration come at the cost of high complexity, inefficient data replication, and manual coordination. For example, real-time data replication would require replicating all of the data in the initial data store to the target data store, which would replicate transient data that may not be necessary in the target data store. Moreover, real-time replication requires duplication of data created during the migration process so that new data is "replicated" in real-time across both stores as it is created. If the initial data store and the target data store are of different types (e.g., key-value and multi-modal) with different schemas, the real-time duplication method becomes highly complex. As another example, a distributed transaction mechanism to enforce the key constraints between the two data stores would be extremely complex and cost additional computing resources to manage the transaction hosts.

By contrast, the workflow launch logic retains the key constraints while allowing the replication of a portion of the data with no downtime, providing a computationally and time efficient process for data store migration. By only replicating immutable data, the migration transition time can be minimized since immutable data can be replicated prior to beginning the transition, with the initial data store operating normally. In addition, any real-time replication of data during the transition from one data store to another is limited to immutable data and not all data, and only during a portion of the migration process. Since creating immutable data is typically an infrequent operation, the computational expense of replicating immutable data created during the transition is reduced.

FIG. 1 depicts a simplified block diagram 100 and associated flow chart of an example process 101 to migrate data from an initial data store 112 to a target data store 114. The initial data store 112 may be any of a number of different types of data stores, databases, or other storage systems, including, but not limited to, a key-value database, a NoSQL database, a multimodal database, or the like. Similarly, the target data store 114 may be any of the same types of data stores or databases. In some embodiments, the target data store 114 is a different type of data store than the initial data store 112. For example, the initial data store 112 can be a key-value database, while the target data store may be a multimodal database. In some other embodiments, the initial data store 112 and target data store 114 may be the same type of database. The initial data store 112 and target data store 114 may have the same or different schema, according to certain embodiments.

The initial data store 112 and target data store 114 may be implemented in a distributed computing system, for example a cloud computing environment. The distributed computing system may be configured to provide one or more applications the ability to transact with the initial data store 112, the target data store 114, or one or more other data stores. The distributed computing system may also be configured to host and execute applications for one or more customers as a multi-tenant environment. In a multi-tenant environment, the one or more customers can interact with instances of applications executing within the distributed computing system, which in turn may transact with one or more data stores, including the initial data store 112 and target data store 114. In some embodiments, one or both of the data stores may be implemented as pluggable databases. A pluggable database may be a virtual database within a larger virtual or physical database. In some embodiments, each customer using the distributed computing system may have its own pluggable database for each application. For example, a customer may have a database associated with its workflow data. In some other embodiments, one or more customers may share one or more pluggable databases associated with an application. Isolation requirements within the multi-tenant environment may determine the extent of sharing of data storage resources within the environment.

Turning now to the flow diagram for process 101, migrating data from the initial data store 112 to the target data store 114 can be broken into phases represented by the blocks of process 101. The phases can include an initial Stable phase (at block 102), a Pre-Migration phase (at block 104), a Migration phase (at block 106), a Post-Migration phase (at block 108), and a Stable (End) phase (at block 110). Process 101 may proceed through each phase according to satisfying one or more precedent conditions at the current phase and then performing one or more actions to effect the phase transition. For example, a precedent condition may be that all host nodes within a distributed computing system recognize that the target data store 114 has been designated the primary data store for an application.

At block 102, an initial data store 112 is implemented. Implementing the initial data store 112 can include identifying an existing data store for which data migration is to be performed. The initial data store 112 may be designated as the primary data store. The distributed computing system can identify the primary data store as the data store with which the distributed computing system can transact. The initial data store 112 can also have an initial store status of "open." When the initial data store 112 is open, requests to launch instances (e.g., create data entities, launch workflow instances, etc.) associated with the initial data store 112 will succeed, and the distributed computing system can transact with the initial data store 112 normally, as indicated by the "Transaction" arrow in diagram 100. The initial store status and the designation as the primary store may be represented by data stored at the initial data store 112 or another data store associated with the application (e.g., another WFaaS data store).

A condition for transitioning from the Stable phase can include that all hosts (e.g., WFaaS servers) within the distributed computing system recognize that the initial data store 112 is designated as the primary data store. The transition from the Stable phase to the Pre-Migration phase can include the operation of implementing a target data store 114.

At block 104, the target data store 114 can be implemented within the distributed computing system. In some embodiments, the target data store 114 can be a new data store or database provisioned by the distributed computing system. The target data store 114 can have a target store status of "open." Although the target store status is open, requests to launch instances (e.g., launch workflow instances, create data entities) will be routed to the initial data store 112, as the primary data store.

A condition for transitioning from the Pre-Migration phase to the Migrating phase can include the target data store 114 has been correctly provisioned, has the target store status of "open," and a portion of the data stored at the initial data store 112 has been replicated to the target data store 114. For migrating workflow data, the portion of the data replicated can be all the immutable data at the initial data store 112, without replicating transient data or key data. The transition from the Pre-Migration phase to the Migrating phase can include the operation of setting the initial store status to "closed." This operation may be a transaction with the initial data store 112 to update the initial store status stored therein.

As mentioned briefly above, during the Pre-Migration phase, after or during the replication of a portion of the data but prior to closing the initial data store 112, customers can launch new instances. Because the initial data store 112 is designated the primary data store, these new instances may have associated processes configured to transact with the initial data store 112 and can create new data at the initial data store 112 that should be replicated at the target data store 114 but may have been omitted when the portion of data was replicated. To ensure proper data replication during the Pre-Migration phase, transactions that create new data can be configured to create that new data at both the initial data store 112 and the target data store 114 (similar to a real-time replication of the newly created data). Within the WFaaS system exemplified herein, the new data can be new immutable data.

At block 106, the Migration phase is entered by changing the initial store status from open to closed. When the initial store status is closed, launch requests will be rerouted from the initial data store 112 to the target data store 114. This rerouting of the launch request can occur even though the initial data store 112 is still designated as the primary data store. Previously launched instances may still have associated processes executing and transacting with the initial data store 112. For workflow instances launched at the target data store 114, once the migration process reaches the Migration phase the distributed computing system can check for key data at the initial data store to verify key idempotency. This check can ensure that multiple workflow instances with the same key are not launched at the same time.

A condition for transitioning from the Migration phase to the Post-Migration phase can be that all hosts (e.g., WFaaS servers) recognize that the status of the primary store (the initial data store 112) is "closed." Because the condition may only require an acknowledgment from the hosts within the computing environment, the time spent in the Migration phase will be relatively short (e.g., on the order of minutes). The transition from the Migration phase to the Post-Migration phase can include designating the target data store 114 as the primary data store.

At block 108, the target data store 114 is now the primary data store for instances launched within the distributed computing system. As the primary data store, new launch requests will be routed to the target data store 114. As with the Migration phase at block 106, previously launched instances may still have associated process executing and transacting with the initial data store 112.

A condition for transitioning from the Post-Migration phase to the Stable (End) phase can include that the data within the initial data store 112 that was not replicated to the target data store 114 has been drained from the initial data store 112. For workflow data, the data to be drained is transient data, which can be removed after a period of time by a garbage collection process. A further condition can be that all keys stored in the initial data store 112 have gone out of scope. Because data from the initial data store 112 may persist until the end of the lifetime of instances and their associated processes executing and transacting with the initial data store 112, the Post-Migration phase may last for a relatively long period of time (e.g., several days). The transition to the Stable (End) phase can be the removal (e.g., deprovisioning) of the initial data store 112 from the distributed computing system.

Finally, at block 110, the computing environment returns to a stable state in the Stable (End) phase. The target data store 114 can be the primary store and receive launch requests for instances (e.g., workflow instances, creating new data entities, etc.). The Stable (End) phase is a mirror of the initial Stable phase, with the target data store 114 taking the place of the initial data store 112.

As described in more detail below with respect to FIG. 5, the migration process can include functionality to support rolling back the data migration. For roll-back operations, the launch logic for workflow instances remains the same, providing the techniques disclosed herein with additional flexibility and advantages over conventional migration methods. Rolling back the migration from the Stable (End) phase proceeds as described above for the forward migration. Rolling back from the Pre-Migration phase includes removal of the target data store 114. In some embodiments, rolling back during the Migration phase may not be permitted, to avoid conflicts. Rolling back from the Post-Migration phase can include replicating new data created in the target data store 114 to the initial data store 112 and then proceeding as above as if the system were in the Pre-Migration state of the forward migration but with the "initial" and "target" nature of the data stores swapped.

Figure 2:
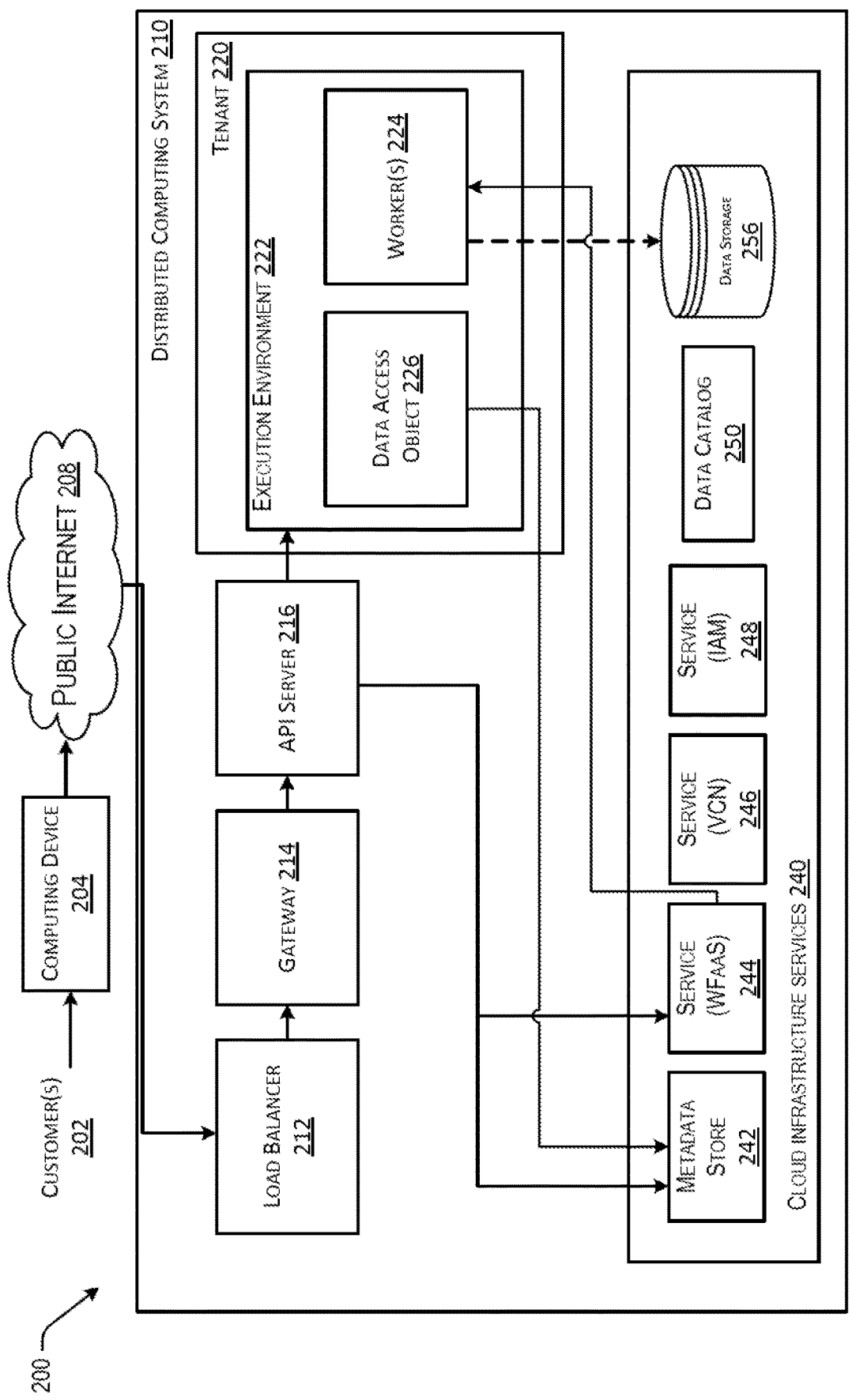
FIG. 2 illustrates an example distributed computing system implementing a workflow service that can launch processes for transacting with a data store, according to some embodiments.

FIG. 2 depicts a distributed computing system 210 in a cloud computing environment 200 that implements a workflow service that can launch processes for transacting with a data store, according to some embodiments. The distributed computing system 210 may be implemented by one or more computing systems that execute computer-readable instructions (e.g., code, program) to implement the distributed computing system. As depicted in FIG. 2, the distributed computing system 210 includes various systems including a load balancer 212, a gateway 214 (e.g., a multi-tenant gateway), an Application Programming Interface (API) server 216, and one or more execution environments 222. Portions of data or information used by or generated by the systems shown in FIG. 2 may be stored on the data storage 256. In some embodiments, the data storage 256 can include one or more of the data stores described herein, including, for example, the initial data store 112 and target data store 114 of FIG. 1. The systems depicted in FIG. 2 may be implemented using software (e.g., code, instructions, program) executed by one or more processing units (e.g., processors, cores) of a computing system, hardware, or combinations thereof. The software may be stored on a non-transitory storage medium (e.g., on a memory device).

The distributed computing system 210 may be implemented in various configurations. In the embodiment shown in FIG. 2, the distributed computing system 210 may be implemented on one or more servers of a cloud provider network. The computing environment 200 comprising the distributed computing system 210 depicted in FIG. 2 is merely an example and is not intended to unduly limit the scope of claimed embodiments. One of ordinary skill in the art would recognize many possible variations, alternatives, and modifications. For example, in some implementations, the distributed computing system 210 can be implemented using more or fewer systems than those shown in FIG. 2, may combine two or more systems, or may have a different configuration or arrangement of systems.

In some embodiments, an execution environment (e.g., execution environment 222) may represent an environment (e.g., a "client" node(s), host node(s), etc.) for executing some or all of the tasks of a workflow (e.g., a workflow instance, step instance, etc.). Different execution environments may be associated with a tenant (e.g., a customer). For instance, in the embodiment shown in FIG. 2, the execution environment 222 is associated with a tenant 220 of the distributed computing system. One or more different execution environments may be associated with additional tenants. An execution environment may be configured to perform operations in a coordinated fashion utilizing any suitable number of computing nodes. A "computing node" (also referred to herein as a "node") may include a server, a computing device, a virtual machine, or any suitable physical or virtual computing resource configured to perform operations as part of the execution environment.

Resources allocated to a tenant of the distributed computing system are selected from a plurality of cloud based resources that are arranged in a hierarchical manner. For instance, as shown in FIG. 2, the resources can be a pool of cloud infrastructure services 240. The cloud infrastructure services 240 can include metadata store 242, workflow as a service (WFaaS) 244, virtual cloud network (VCN) 246, identity and access management (IAM) services 248, and a data catalog 250. Metadata store 242 can be implemented as a key-value database as a service (KaaS) or other suitable data storage service.

In certain embodiments, a user (e.g., a customer 202) may interact with the distributed computing system 210 via a computing device 204 that is communicatively coupled to the distributed computing system 210 possibly via a public network 208 (e.g., the Internet). The computing device 204 may be of various types, including but not limited to, a mobile phone, a tablet, a desktop computer, and the like. A user may interact with the cloud computing system using a console user interface (UI) (which may be a graphical user interface) of an application executed by the computing device or via API operations provided by the distributed computing system 210.

As an example, a user associated with tenant 220 of the distributed computing system 210 may interact with the distributed computing system 210 by transmitting a request (e.g., a launch request, a launch-instance request, etc.) to the distributed computing system 210 to create a new data entity (e.g., launch a workflow instance). In response, the distributed computing system 210 may then execute one or more worker(s) 224 within execution environment 222. The launch request may be received by a load balancer 212 in the distributed computing system 210 which may transmit the request to a multi-tenant proxy service, for example gateway 214, within the distributed computing system. The gateway 214 may be responsible for authenticating/authorizing the user's request and routing the request to an API server 216 that may be configured to execute operations to communicate with one or more cloud services (e.g., metadata store 242, WFaaS 244) or the execution environment 222 to execute the request. In certain examples, the gateway 214 may represent a shared multi-tenant Hyper Text Transfer Protocol (HTTP) proxy service that authorizes the user and submits the user's request to the API server 216.

For WFaaS processes, the worker(s) 224 may execute one or more tasks corresponding to one or more workflow instances. The worker(s) 224 can be configured to transact with data storage 256 and the metadata store 242. The metadata store 242 can identify the designated primary data store. The one or more tasks corresponding to the workflow instance can include the creation of one or more data entities at the data storage 256. Interaction with the metadata store 242 can be by way of a data access object 226, which can be configured to interact with the data storage service present within the distributed computing system 210. FIG. 2 does not constrain what data storage system implements the data storage 256.

The launch request can include a key. In some embodiments, the key can be a surrogate key along with a surrogate scope. WFaaS 244 can respond to launch requests by returning a globally unique instance ID to the customer. The instance ID may be an example of transient data, while the key is an example of key data. When a workflow instance is launched, the instance ID and the key may be stored in the data store with which the worker(s) 224 are configured to transact.

In some embodiments, a customer can query a workflow instance by submitting a query that targets the instance ID or the surrogate key associated with the workflow instance. To protect this functionality during migration, the instance ID can include a reference or other identification of the data store to which the instance was associated at launch. The query targeting the instance ID will then target the data store that is handling that instance. Encoding the data store identification into the instance ID may also allow for related program functions (e.g., API calls) to successfully interact with the workflow instance during migration. For surrogate key queries, WFaaS will target both the initial data store and the target data store and receive query results from the data store with the instance (e.g., instance transient data).

Figure 3:
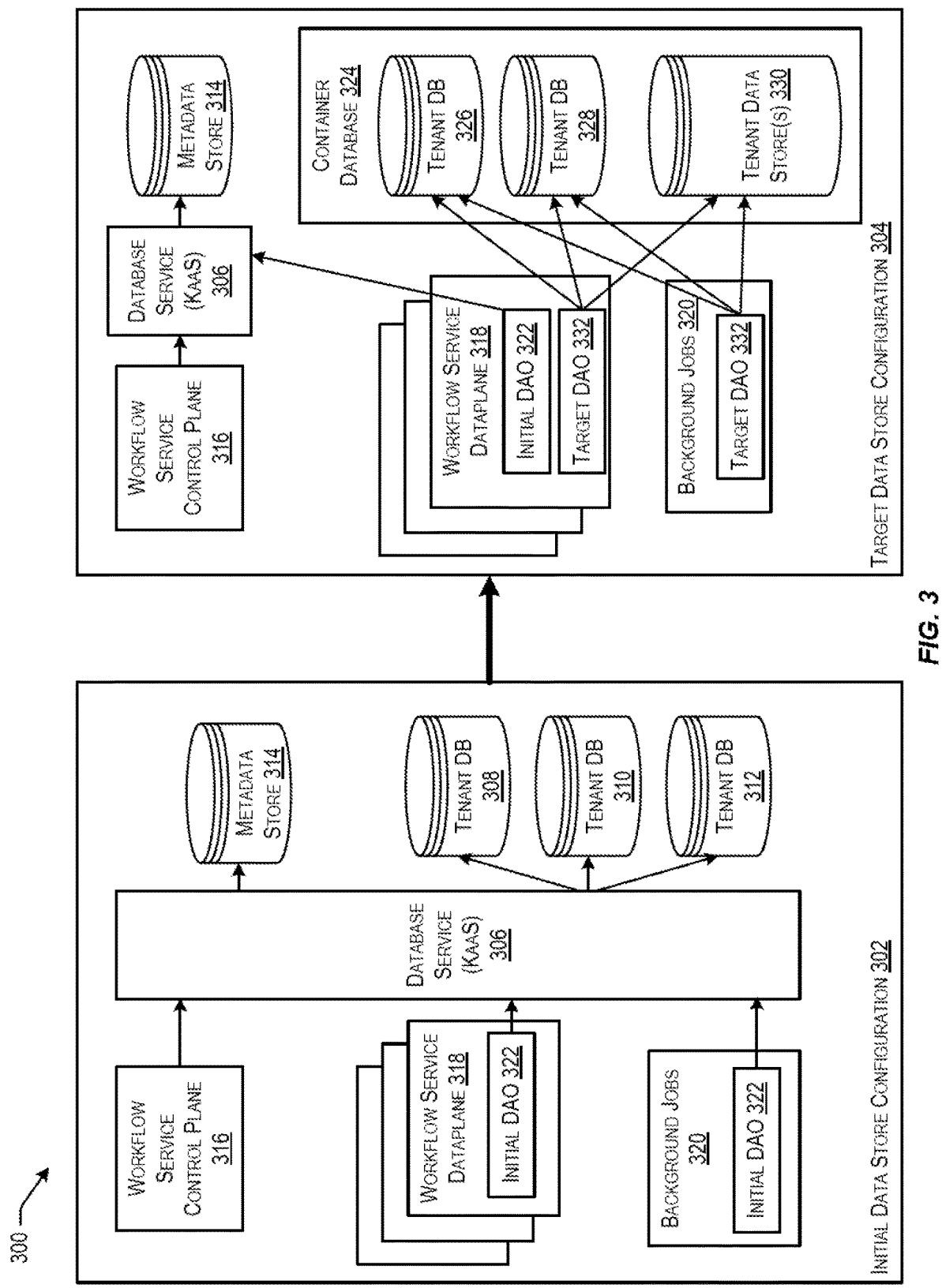
FIG. 3 is a simplified block diagram illustrating an example initial data store configuration and target data store configuration for a migration of data, according to an embodiment.

FIG. 3 is a simplified diagram 300 of an example initial data store configuration 302 and target data store configuration 304 for a migration of data, according to an embodiment. Both the initial data store configuration 302 and the target data store configuration 304 are implemented for a multi-tenant environment executing workflow instances, with each tenant associated with its own database. As shown in FIG. 3, the initial data store configuration 302 can include one or more key-value databases provided by database service (KaaS) 306. For example, tenant databases 308-312 can be dedicated databases (e.g., pluggable databases) for each tenant's workflow data (e.g., immutable, transient, and key data). In this example, database service (KaaS) 306 serves a dual role as both metadata store 314 (e.g., metadata store 242) and data storage (e.g., data storage 256). Additionally, the initial data store configuration 302 can include one or more additional data stores or databases (e.g., metadata store 314) that are implemented as key-value databases. The metadata store 314 may be used to store data associated with the control plane service 316 of the workflow service (e.g., WFaaS, which may be similar to service (WFaaS) 244 of FIG. 2).

A workflow service dataplane 318 may represent the dataplane services of WFaaS used by one or more tenants of distributed computing system, including the execution environment 222 described with respect to FIG. 2. The workflow service dataplane 318 can therefore include execution processes associated with the workflow instances for the tenants of the distributed computing system. The workflow service dataplane 318 can interact with the database service (KaaS) 306 via an initial data access object (DAO) 322. The initial DAO 322 can be an interface layer configured for the particular database service, in this case KaaS 306. As with data access objects typical in the art, the initial DAO 322 can provide abstraction between the execution processes of the workflow dataplane 318 (e.g., worker(s) 224) and the data storage system employed by KaaS 306. In some other embodiments, the initial data store configuration can implement a different type of database service (e.g., multi-modal) that can use a different DAO to provide the abstraction layer.

The WFaaS can also include one or more background jobs 320 to help manage the execution of the workflow instances. These background jobs 320 can include an anti-entropy engine, delayed workflow execution processes, garbage collection, and service health monitoring. These jobs can be configured to transact with one or more data stores in the initial data store configuration 302. The background jobs 320 can interface with the KaaS 306 using the same initial DAO 322 as for the workflow service dataplane 318.

After data migration, the target data store configuration 304 can include one or more data stores that are different from the data stores in the initial data store configuration 302. As shown in FIG. 3, the target data store configuration 304 can include a container database 324. The container database 324 can include one or more pluggable databases containing the tenant's workflow dataplane data that was migrated from the initial data store configuration. The new configuration after migration can include data stored in separate data stores for each customer. In some embodiments, a tenant may have its own data store, for example, tenant database 326 and tenant database 328. Other tenants of the distributed computing system can have one or more pluggable databases for their tenant data store(s) 330.

Since the target data store configuration 304 can include data storage systems that differ from the initial data store configuration 302, in some embodiments the workflow service dataplane 318 can implement a target DAO 332 configured to interface with the data storage system of the target data store configuration 304. In embodiments where the type of data storage system implemented for the post-migration configuration is unchanged from the pre-migration configuration, the DAO used by the workflow service may not change. In some embodiments, one or more of the data stores of the initial data store configuration 302 may not be migrated. For example, the metadata store 314 for workflow service control plane 316 data may remain unchanged during the migration process for the tenants. The metadata store 314 can then be a different type (e.g., key-value) than the other data stores in the target data store configuration 304. To interface with the metadata store (via KaaS 306), the workflow service dataplane 318 may retain the initial DAO 322 in addition to implementing the new target DAO 332.

Figure 4:
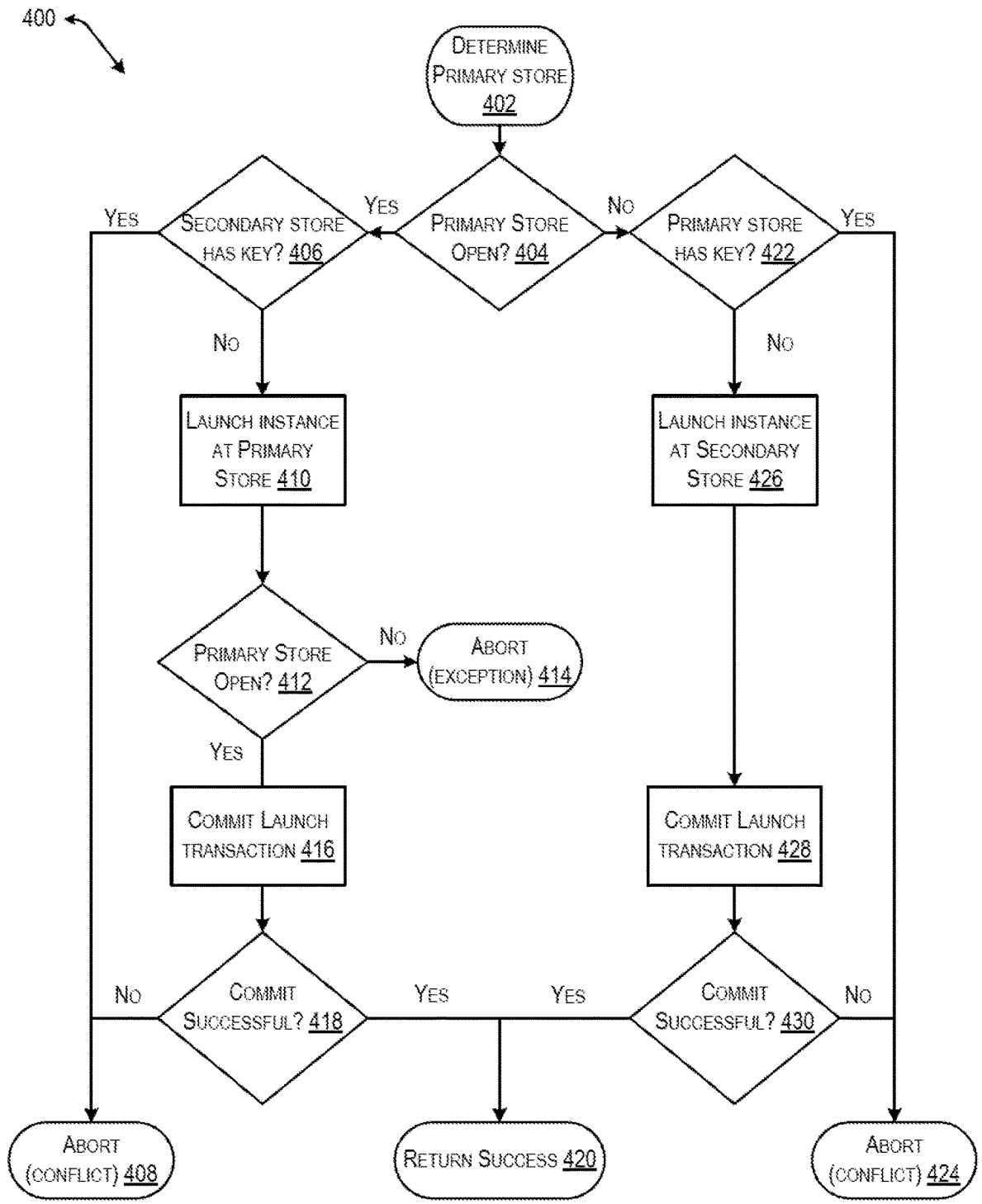
FIG. 4 is a flow diagram of an example process for handling process launch logic during a migration of data from an initial data store to a target data store, according to some embodiments.

FIG. 4 is a flow diagram of an example process for handling instance launch logic during a migration of data from an initial data store to a target data store, according to some embodiments. The initial data store may be one of the initial data stores discussed herein, including initial data store 112 of FIG. 1. Similarly, the target data store may be one of the target data stores discussed herein, for example, target data store 114. The process 400 (as well as processes 600 and 700) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

The launch logic illustrated by process 400 may be implemented by a process of a distributed computing system responsible for reading and writing to data stores within the distributed computing system. The reads and writes may be for the purpose of launching workflow instances. In some embodiments, the process may be a component of the workflow service (e.g., WFaaS 244).

At entry 402, the process for launching an instance during migration begins by determining the primary data store. Depending on the phase of the migration process, the primary data store may be the initial data store or the target data store. For example, during the Pre-Migration and Migration phases described with respect to FIG. 1, the primary data store is the initial data store. During the Post-Migration and Stable (End) phases, the primary data store is the target data store. The launch logic of process 400 is agnostic to the migration phase, such that it can apply during any phase of a migration or a roll-back operation between two data stores. The data store not designated the primary data store may be referred to as the secondary data store. The designation of the primary data store may be a flag or other data stored at the primary data store or another data store implemented in the distributed computing system.

At decision 404, the primary store determined at 402 is checked to determine its store status. This check can be a transaction with the primary data store to read the store status that may be stored within the primary data store. In some embodiments, a different data store may contain the store status for the primary store and the secondary data store, such that the verification includes a transaction to read the store status data from the different data store. If the primary data store is "open," the launch request is routed to the primary store. If the primary data store is "closed," the launch request is routed to the secondary store. Prior to launching the instance, additional checks can be made to verify key data idempotency and that primary store status has not changed in the time required to process the launch request.

Following the verification that the primary store is open, to ensure that the workflow instance does not violate the singleton key requirements of the workflow service, the distributed computing system can check the secondary store for the presence of the key received with the launch request, at decision 406. If the secondary store has a matching key, then an instance with that key has already been launched at the secondary store. Because a second instance with the same key may not be launched, the process can abort with a conflict at endpoint 408. This behavior is the same during a stable phase when migration is not occurring; a customer cannot launch a second instance with the same key.

If the secondary store does not have a matching key, then the process can move to block 410 where the instance is launched, with corresponding tasks to be executed by an execution process (e.g., worker(s) 224) in an execution environment and configured to transact with the data store currently designated the primary data store, which may be the initial data store or the target data store depending on the migration phase.

During migration, the primary store can have its store status changed from "open" to "closed." Because the change in store status can be a transaction with the primary database, the status may be updated (and that update committed) at the primary data store before the instance is fully launched (e.g., before the workflow instance is committed to the primary data store). In other words, executing a launch request and receiving the transition instruction for one migration phase to the next may occur nearly simultaneously, such that the primary data store is closed before the instance is launched and its associated key data is stored in the corresponding data store. In this case, it may be possible for a second launch request with the same key to be received, routed to the secondary store (since the primary store was just closed), and successfully launch a second instance at the secondary store (since the key from the first launch request has not been committed to the primary data store). To avoid this, before committing the launch at the primary store, a second verification occurs at decision 412 to check that the primary store is still "open." If it is not, then the process can abort with an exception at endpoint 414.

If the primary store is still open, the launch transaction can be committed at block 416. A final check can be performed at decision 418 to verify that the launch transaction (e.g., committing instance metadata to the primary data store) was successful. If so, the process can end with a report of success at endpoint 420. If the launch commit was not successful, then the process can abort at endpoint 408.

Returning to decision 404, if the primary store is closed when the launch request is received, the request is routed to the secondary store. Blocks 422, 424, 426, 428, and 430 are similar to the operations described for corresponding blocks 406, 408, 410, 416, and 418, respectively, described above, but with the instance launching at the secondary store, such that execution processes corresponding to the instance are configured to transact with the secondary store. At decision 422, the check for key data is performed at the primary store (e.g., the initial data store if the secondary store is currently the target data store). Because the migration process changes the primary data store's status from "open" to "closed" before designating the secondary data store as the new primary store, the safety check operations of decision 412 may not be performed for the secondary data store.

Figure 5:
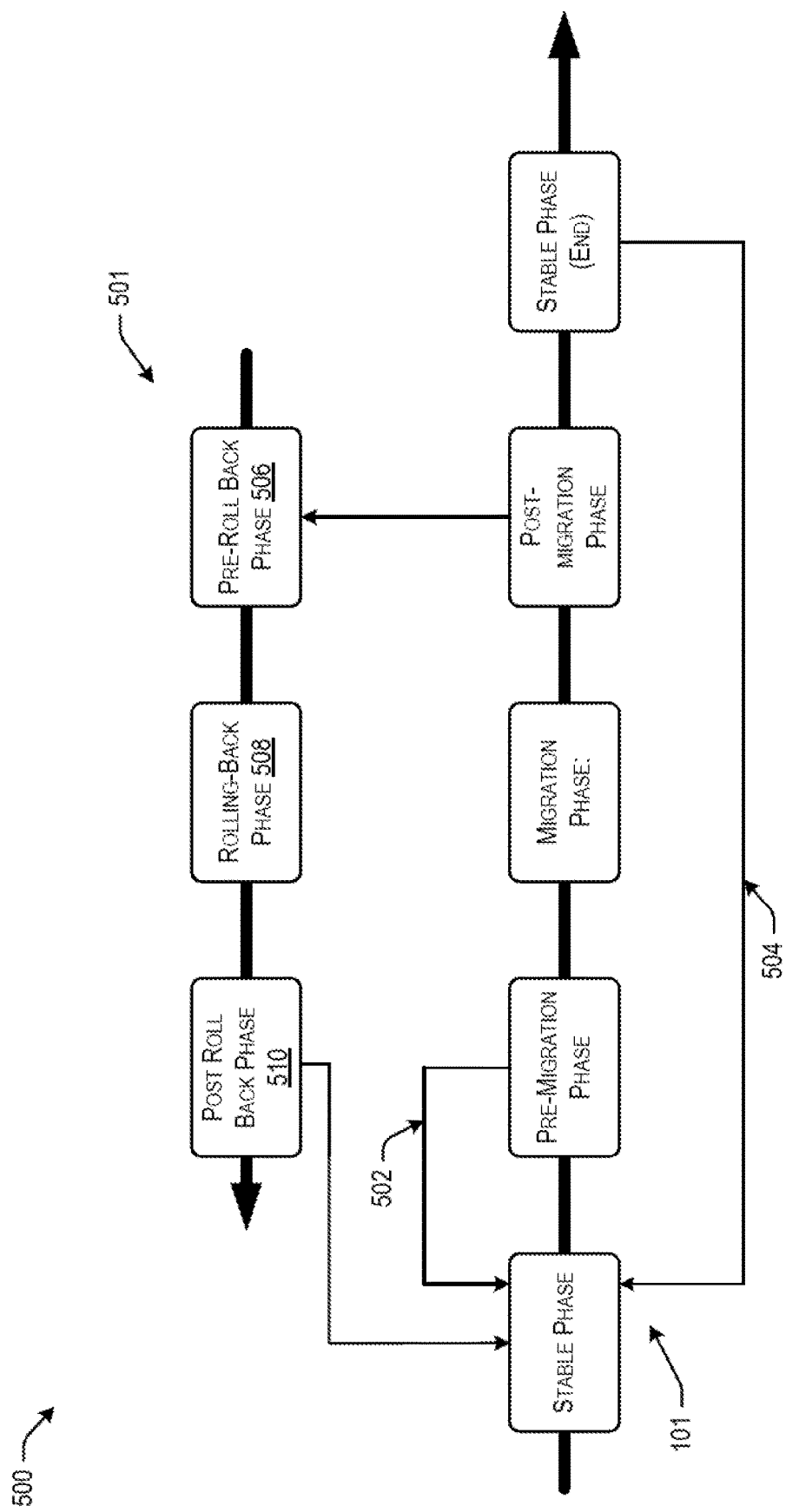
FIG. 5 is a flow chart of an example process for rolling back a data migration from an initial data store to a target data store, according to some embodiments.

FIG. 5 depicts a flow diagram 500 for an example process 501 for rolling back a migration of data from an initial data store to a target data store, according to some embodiments. The initial data store and target data store may be similar to initial data store 112 and target data store 114 of FIG. 1. Process 101 may be the same process depicted in FIG. 1 with five phases for migrating data. Rolling back a migration can include replication of new data created in the target data store, closing the target data store, designating the initial data store as the primary data store, and eventual removal of the target data store from a distributed computing system. In general, roll back operations are a reversal of the forward migration operations discussed previously.

In some embodiments, roll back operations are supported from all phases of the migration process except for the Migration phase. As noted briefly above, a roll back operation 502 from the Pre-Migration phase (that is, before the initial data store is closed) can include removing (e.g., deprovisioning) the target data store, since no new data has been created at the target data store. A roll back operation 504 from the Stable (End) phase can be the reverse of the forward migration of process 101, and may be treated as a separate migration rather than a roll back.

For a roll back process 501 from the Post-Migration phase, the target data store may contain new data (e.g., new immutable data) created by the distributed computing system (e.g., in response to a customer creating a new workflow definition) while in the Post-Migration phase. The roll back proceeds similarly to the forward migration but with the process reversed.

At block 506, the Pre-Roll Back phase is entered by changing the initial store state from "closed" to "open." As a condition to entering the Pre-Roll Back phase, a portion of the new data (e.g., the new immutable data) in the target data store is replicated to the initial data store.

At block 508, the Rolling Back phase is entered by closing the target data store. The launch logic described with respect to FIG. 4 continues to apply to launch requests received in the Pre-Roll Back, Rolling Back, and Post Roll Back Phases. A condition for transitioning to the Post Roll Back phase can be that all hosts (e.g., WFaaS servers) recognize that the status of the primary data store is closed.

At block 510, the Post Roll Back phase is entered by designating the initial data store as the primary data store. A condition for transitioning to the Stable phase can be that all hosts (e.g., WFaaS servers) recognize that the initial data store has been designated the primary data store and that data (e.g., transient data, key data) has been drained from the target data store. Once these conditions are met, the Stable phase, with only the initial data store, can be entered by removing the target data store.

Figure 6:
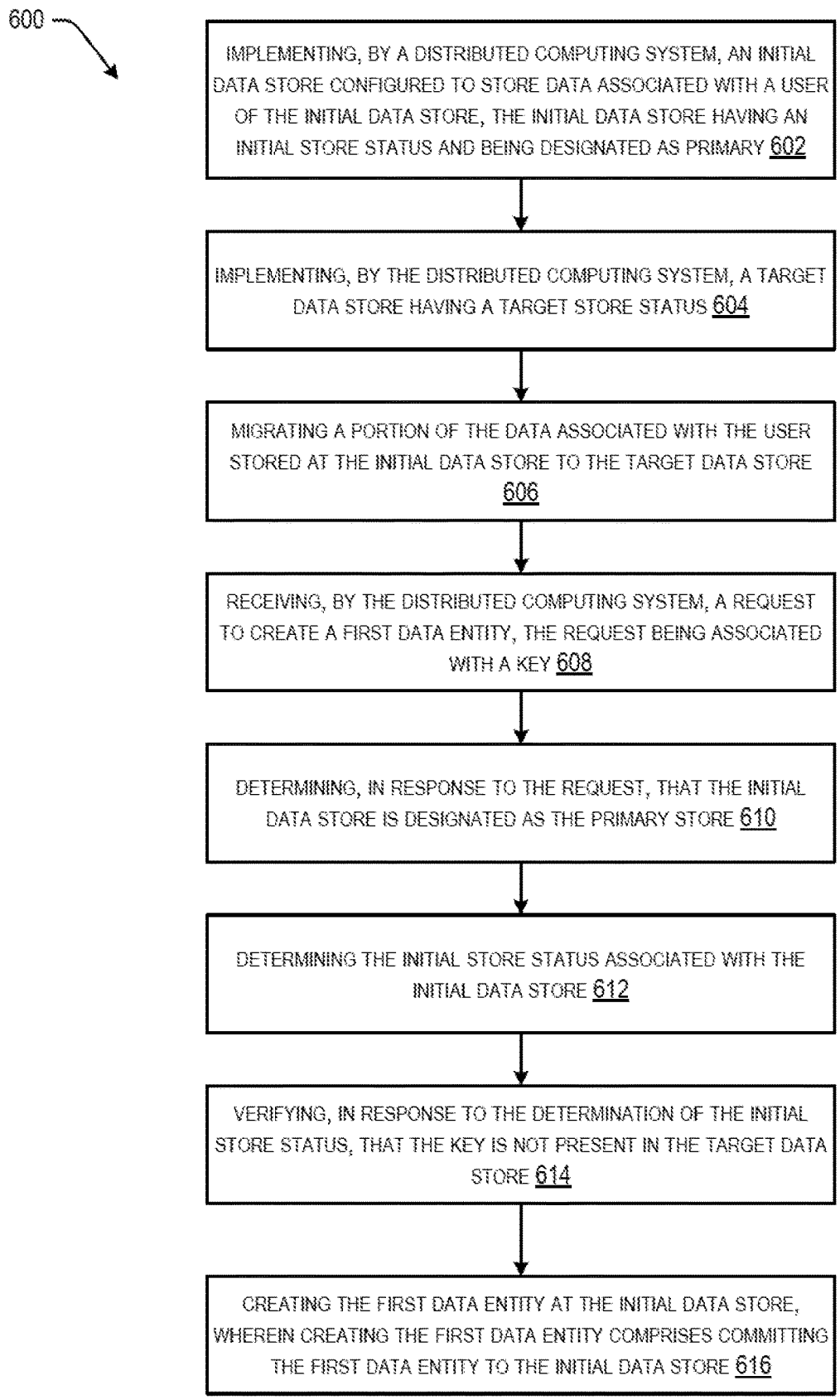
FIG. 6 is a simplified flow diagram of an example process to create a first data entity during migration of data from an initial data store to a target data store, according to some embodiments.

FIG. 6 is a simplified flow diagram of an example process 600 to create a data entity (e.g., launch a workflow instance) during migration of data from an initial data store to a target data store, according to some embodiments. The initial data store and target data store may be similar to any of the initial data stores and target data stores discussed herein, for example initial data store 112 and target data store 114 of FIG. 1.

The process 600 may begin at block 602 with a distributed computing system implementing an initial data store. Implementing the initial data store can include provisioning the data store. The initial data store can be configured to store data associated with a user (e.g., customer 202) of the initial data store. The user may be a tenant of the distributed computing system. The initial data store can have an initial store status. The initial store status can be open or closed. In some embodiments, the data associated with the user can be immutable data, transient data, and key data. The initial data store can be designated as a primary data store. The designation as the primary data store and the initial store status may be data values stored at the initial data store or at another data store associated with the distributed computing system.

At block 604, the distributed computing system can implement a target data store. Similar to the initial data store, the target data store may be provisioned from the resources available to the distributed computing environment. The target data store may be the same type of data store (e.g., the same database type) as the initial data store or it may be of a different type. The target data store can have a target store status. As with the initial store status, the target store status may be open or closed and may be a data value stored at the target data store or another data store within the distributed computing environment.

At block 606, a data migration process may begin for a portion of the data stored in the initial data store. The migration process may be similar to process 101 described with respect to FIG. 1. In some embodiments, the migration process migrates a tenant of a WFaaS system from an initial data store corresponding to the tenant's workflow data to a target data store. The portion of data can include immutable workflow data, while data not migrated can include transient data and key data associated with one or more workflow instances. Migrating the portion of data can include replicating the portion from the initial data store to the target data store. Migrating the portion of the data can continue until transient data and key data is drained from the initial data store.

During the migration of the portion of the data, the distributed computing system can still handle launch requests for instances. Data entities associated with the instances may be created at either the initial data store or the target data store according to the phase of the migration and the process described herein. At block 608, the distributed computing system (e.g., a scheduling process of the service (WFaaS) 244) can receive a request to create a first data entity (e.g., a workflow instance, with tasks executed by worker(s) 224, etc.). The request can include metadata associated with the first data entity, including a key and a key scope. One or more processes (e.g., worker(s) 224) of the distributed computing system can be configured to transact with the initial data store to create the first data entity. For example, the distributed computing system may read immutable data (e.g., a workflow definition) in order to execute a workflow.

In response to the request, the distributed computing system may determine that the initial data store is designated as the primary store, at block 610. The initial store status associated with the initial data store may also be determined, at block 612. Determining the initial store status can include a transaction with the initial data store to read the data value corresponding to the status. The initial store status may be "open" or "closed."

In response to the determination of the initial store status, the distributed computing system may verify that the key is not present in the target data store, at block 614. At block 616, the distributed computing system can create the first data entity at the initial data store. Creating the first data entity at the initial data store can include writing, reading, updating, and deleting data within the initial data store. The distributed computing system may also abort the creation of the first data entity prior to committing data associated with the first data entity to the initial data store.

Figure 7:
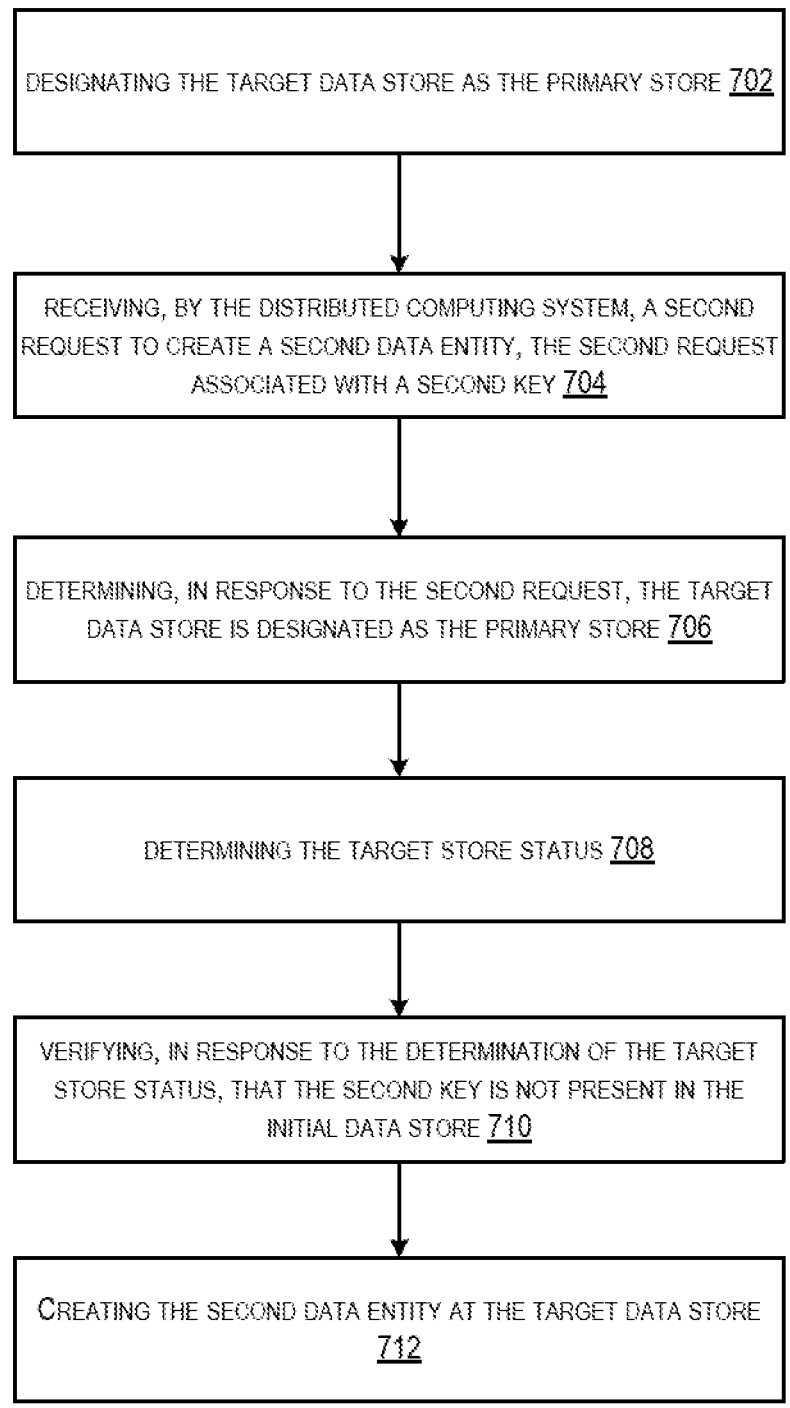
FIG. 7 is another simplified flow diagram of an example process to create a second data entity during migration of data from an initial data store to a target data store, according to some embodiments.

FIG. 7 is another simplified flow diagram of an example process 700 to create a second data entity (e.g., launch a second workflow instance) during migration of data from an initial data store to a target data store, according to some embodiments. As with FIG. 6, the initial data store and target data store may be similar to other initial data stores and target data stores discussed herein. The process 700 may be considered an extension of the process 600 discussed above.

The process begins at block 702 during migration of data from the initial data store to the target data store. The target data store may be designated as the primary store. The distributed computing system can receive, at block 704, a second request to create a second data entity. The second request can include metadata associated with the second data entity, including a second key and a second key scope. One or more process (e.g., worker(s) 224) of the distributed computing system can be configured to transact with the target data store to create the second data entity. For example, the second distributed computing system may read immutable data (e.g., a workflow definition) in order to execute a workflow.

At block 706, the distributed computing system can, in response to the request, determine that the target data store has been designated the primary store (in block 702). The target store status may also be determined, at block 708. The target store status may be "open" or "closed." In response to the determination that the target store status is open, the distributed computing system can verify that the second key is not present in the initial data store, at block 710. Finally, at block 712, the distributed computing system may create the second data entity at the target data store. Creating the second data entity at the target data store can include writing, reading, updating, and deleting data within the target data store. The distributed computing system may also abort the creation of the second data entity prior to committing data associated with the second data entity to the target data store.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 8:
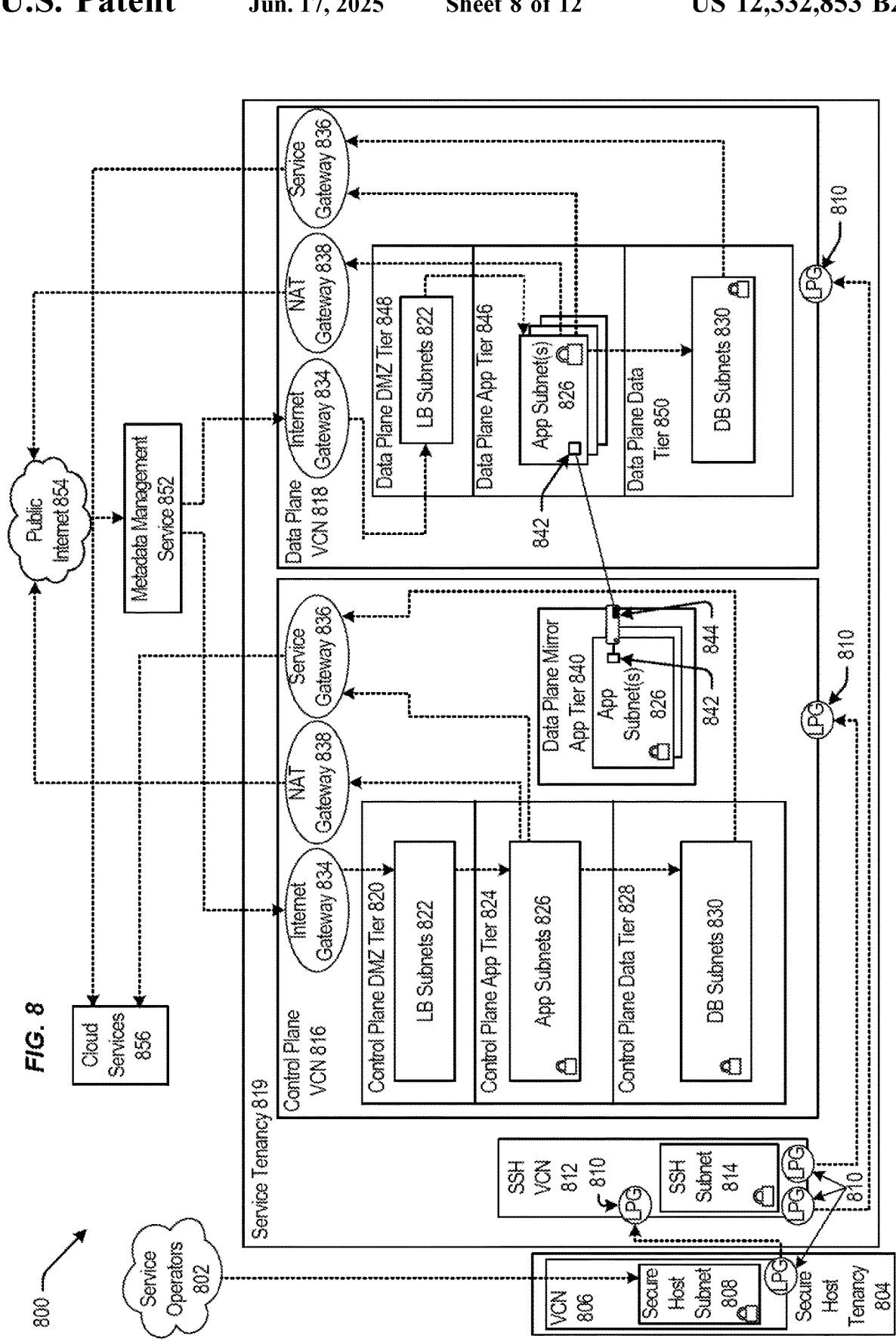
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
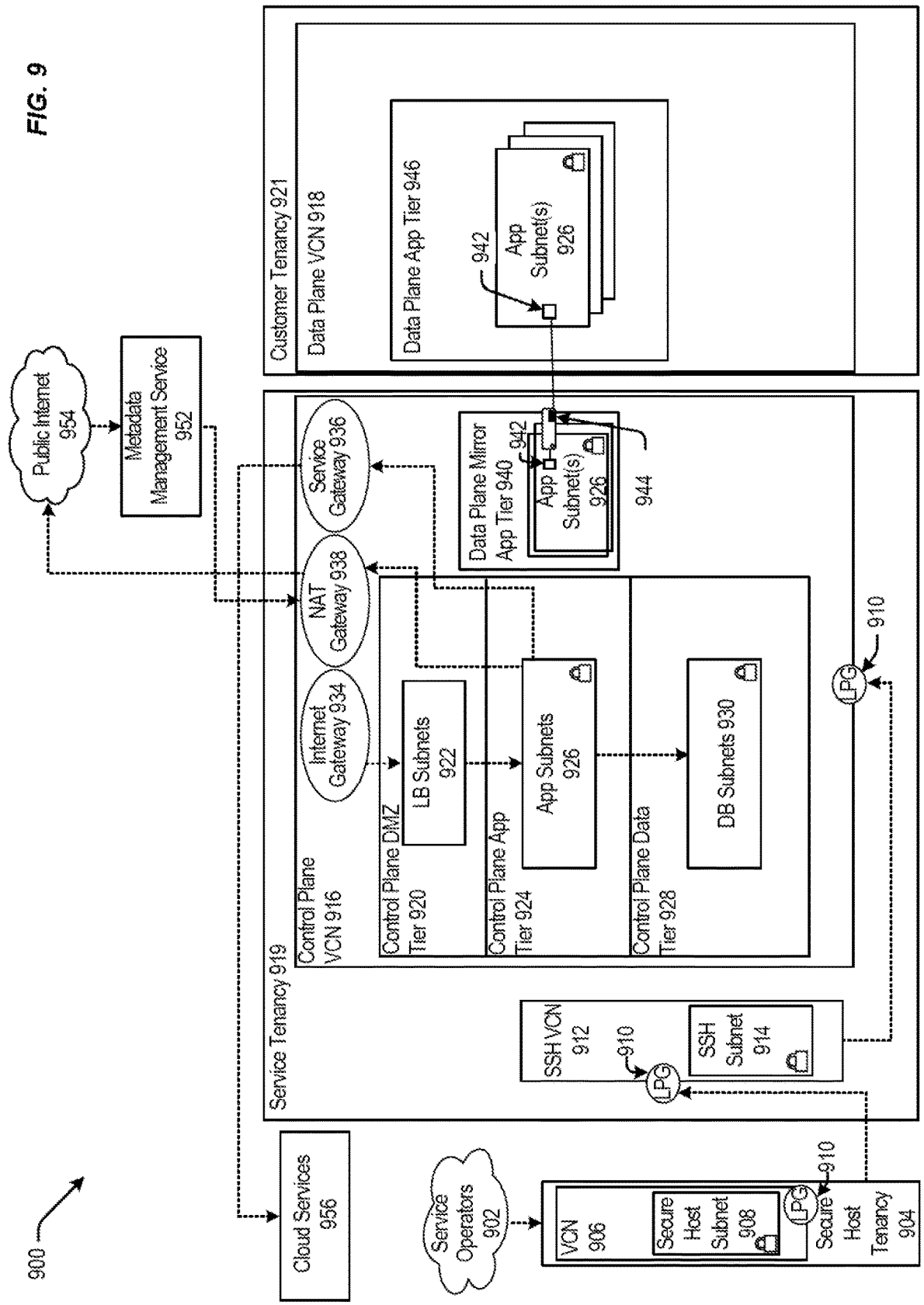
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
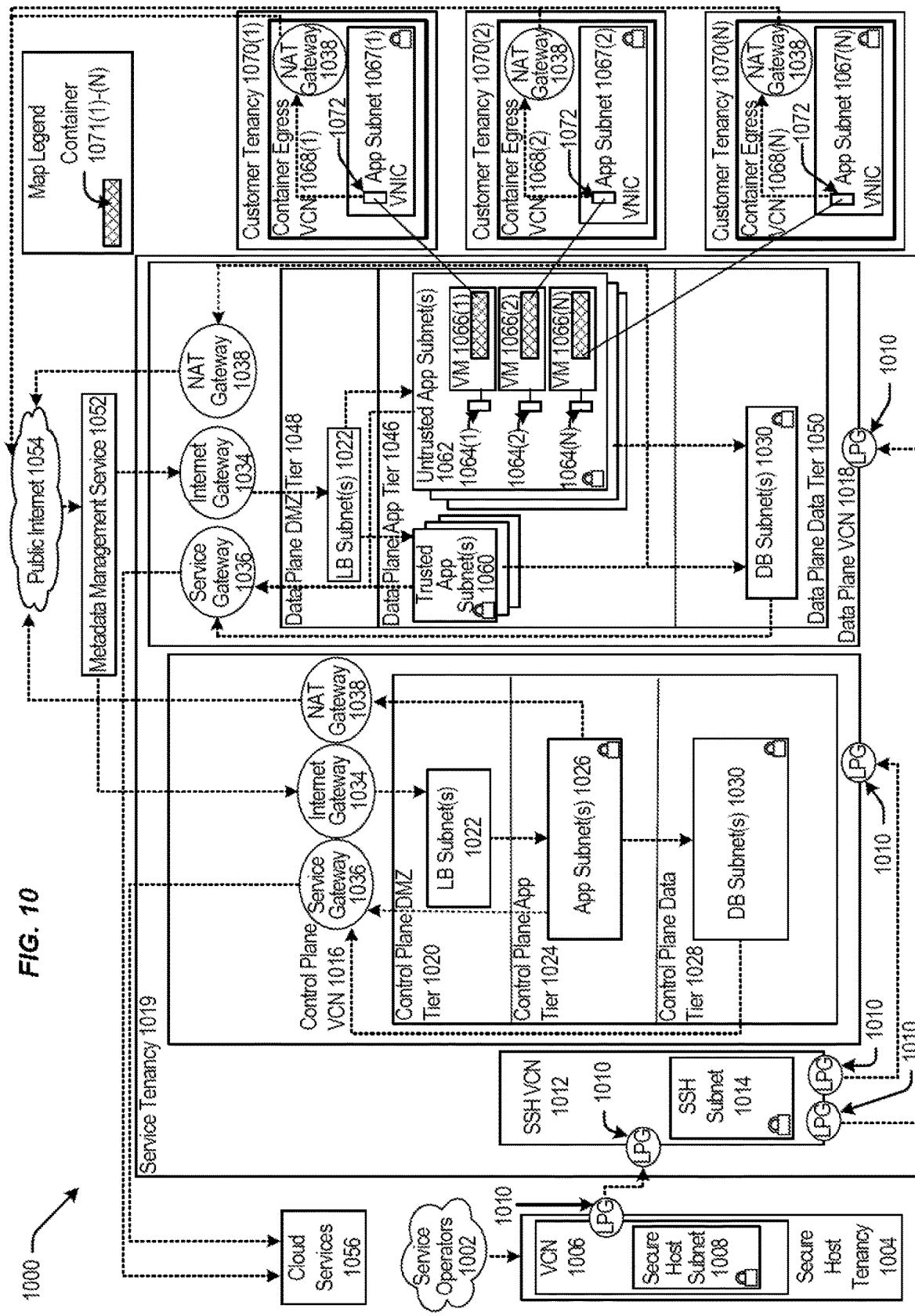
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071 (1)-(N) may be communicatively coupled to the customer tenancy 1070 and may be configured to transmit or receive data from the customer tenancy 1070. The containers 1071 (1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may nm code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
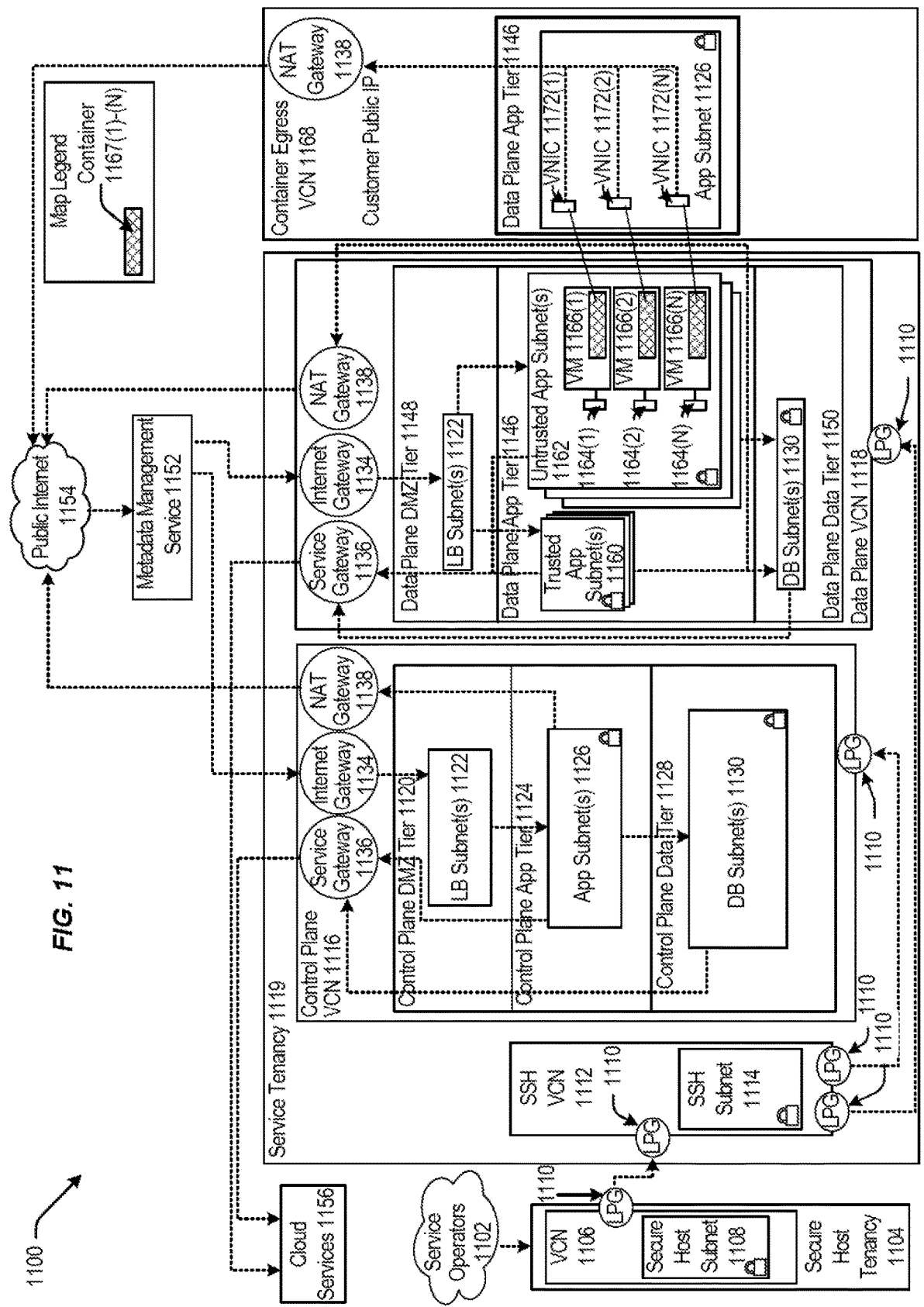
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may nm code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
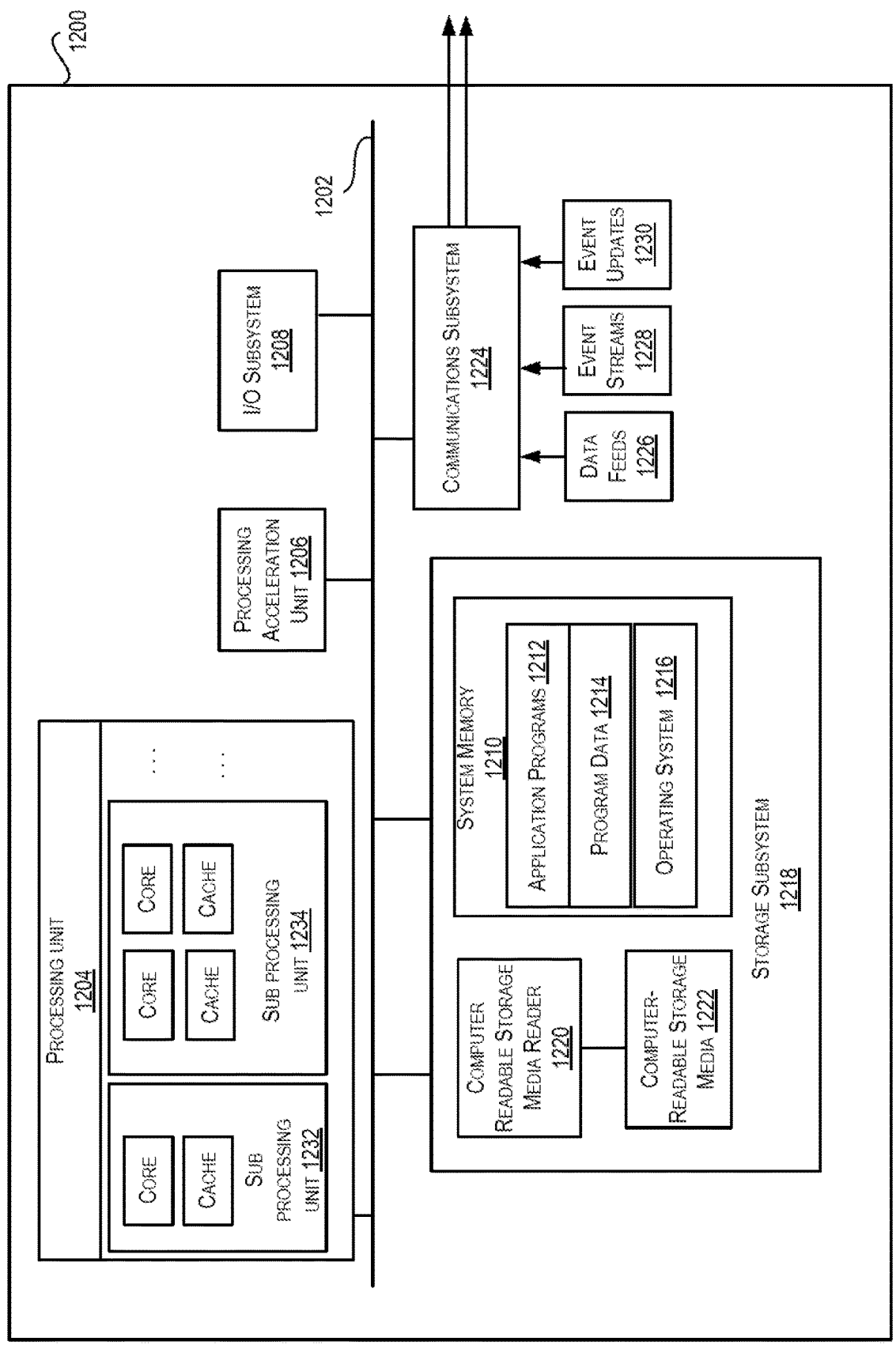
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and moderns.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

Byway of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    implementing, by a distributed computing system, an initial data store configured to store data associated with a user of the initial data store, and a target data store;
    while the initial data store is configured as a primary data store for processing requests, the initial data store has a status of open and the target data store is configured as a secondary data store:
        routing a first request to execute a first data store transaction to the initial data store; and
        initiating, by the initial data store, execution of the first data store transaction;
        storing transient data for executing the first request to the initial data store without storing the transient data to the target data store;
    during execution of the first data store transaction: updating the status of the initial data store to closed, wherein the initial data store continues to execute the first data store transaction subsequent to updating the status of the initial data store;
    while the initial data store is configured as the primary data store for processing requests, the initial data store has the status of closed and the target data store is configured as a secondary data store:
        generating data based on completion of the execution of the first data store transaction, the data comprising immutable data and transient data;
        storing the data generated by the first data store transaction to the initial data store and the target data store by replicating the immutable data without replicating the transient data; and
        rerouting a second request to execute a second data store trans action from the initial data store to the target data store;
    subsequent to completion of the execution of the first data store transaction, configuring the target data store as the primary data store;
    while the target data store is configured as the primary data store:
        routing a third request to execute a third data store transaction to the target data store.

2. The method of claim 1, wherein the first request is associated with a first key, the second request is associated with a second key, and the third request is associated with a third key, the method further comprising:
    verifying that the first key is not present in the initial data store;
    verifying that the second key is not present in the initial data store; and
    verifying that the third key is not present in the target data store.

3. The method of claim 2, comprising:
    generating immutable data based on completion of the execution of the first data store transaction; and
    storing the immutable data generated by the first data store transaction to the initial data store and the target data store.

4. The method of claim 1, comprising, prior to routing the first request, updating a status of the target data store from closed to open.

5. The method of claim 1, wherein the data comprises key data.

6. The method of claim 1, further comprising:
    prior to routing the first request, determining that the initial data store has a status of open.

7. A distributed computing system comprising:
one or more processors; and
one or more memories storing computer-executable instructions that, when executed with the one or more processors, cause the distributed computing system to:
implement an initial data store configured to store data associated with a user of the initial data store, and a target data store;
while the initial data store is configured as a primary data store for processing requests, the initial data store has a status of open and the target data store is configured as a secondary data store:
route a first request to execute a first data store transaction to the initial data store; and
initiate, by the initial data store, execution of the first data store transaction;
store transient data for executing the first request to the initial data store without storing the transient data to the target data store;
during execution of the first data store transaction: update the status of the initial data store to closed, wherein the initial data store continues to execute the first data store transaction subsequent to updating the status of the initial data store;
while the initial data store is configured as the primary data store for processing requests, the initial data store has the status of closed and the target data store is configured as a secondary data store:
generate data based on completion of the execution of the first data store transaction, the data comprising immutable data and transient data;
store the data generated by the first data store transaction to the initial data store and the target data store by replicating the immutable data without replicating the transient data; and
reroute a second request to execute a second data store transaction from the initial data store to the target data store;
subsequent to completion of the execution of the first data store transaction, configure the target data store as the primary data store;
while the target data store is configured as the primary data store:
route a third request to execute a third data store transaction to the target data store.

8. The distributed computing system of claim 7, wherein the first request is associated with a first key, the second request is associated with a second key, and the third request is associated with a third key, and executing the computer-executable instructions further causes the distributed computing system to:
verify that the first key is not present in the initial data store;
verify that the second key is not present in the initial data store; and
verify that the third key is not present in the target data store.

9. The distributed computing system of claim 8, wherein executing the computer-executable instructions further causes the distributed computing system to:
generate immutable data based on completion of the execution of the first data store transaction; and
store the immutable data generated by the first data store transaction to the initial data store and the target data store.

10. The distributed computing system of claim 7, wherein executing the computer-executable instructions further causes the distributed computing system to: prior to routing the first request, update a status of the target data store from closed to open.

11. The distributed computing system of claim 7, wherein the data comprises key data.

12. The distributed computing system of claim 7, wherein executing the computer-executable instructions further causes the distributed computing system to:
prior to routing the first request, determine that the initial data store has a status of open.

13. A non-transitory computer readable medium storing computer-executable instructions that, when executed by one or more processors, cause a distributed computing system to at least:
implement an initial data store configured to store data associated with a user of the initial data store, and a target data store;
while the initial data store is configured as a primary data store for processing requests, the initial data store has a status of open and the target data store is configured as a secondary data store:
route a first request to execute a first data store transaction to the initial data store; and
initiate, by the initial data store, execution of the first data store transaction;
store transient data for executing the first request to the initial data store without storing the transient data to the target data store;
during execution of the first data store transaction: update the status of the initial data store to closed, wherein the initial data store continues to execute the first data store transaction subsequent to updating the status of the initial data store;
while the initial data store is configured as the primary data store for processing requests, the initial data store has the status of closed and the target data store is configured as a secondary data store:
generate data based on completion of the execution of the first data store transaction, the data comprising immutable data and transient data;
store the data generated by the first data store transaction to the initial data store and the target data store by replicating the immutable data without replicating the transient data; and
reroute a second request to execute a second data store transaction from the initial data store to the target data store;
subsequent to completion of the execution of the first data store transaction, configure the target data store as the primary data store;
while the target data store is configured as the primary data store:
route a third request to execute a third data store transaction to the target data store.

14. The non-transitory computer readable medium of claim 13,
wherein
the first request is associated with a first key, the second request is associated with a second key, and the third request is associated with a third key, and executing the computer-executable instructions further causes the distributed computing system to:
verify that the first key is not present in the initial data store;
verify that the second key is not present in the initial data store; and verify that the third key is not present in the target data store.

15. The non-transitory computer readable medium of claim 14, wherein executing the computer-executable instructions further causes the distributed computing system to:
generate immutable data based on completion of the execution of the first data store transaction; and
store the immutable data generated by the first data store transaction to the initial data store and the target data store.

16. The non-transitory computer readable medium of claim 13, wherein executing the computer-executable instructions further causes the distributed computing system to: prior to routing the first request, update a status of the target data store from closed to open.

17. The non-transitory computer readable medium of claim 13, wherein the data comprises key data.

18. The non-transitory computer readable medium of claim 13, wherein executing the computer-executable instructions further causes the distributed computing system to:
prior to routing the first request, determine that the initial data store has a status of open.

* * * * *

UNITED STATES PATENT AND TRADEMARK OFFICE
CERTIFICATE OF CORRECTION

Page 1 of 1

PATENT NO. : 12,332,853 B2
APPLICATION NO. : 17/357578
DATED : June 17, 2025
INVENTOR(S) : Luong et al.

It is certified that error appears in the above-identified patent and that said Letters Patent is hereby corrected as shown below:

On the Title Page

Column 2, item [56], Line 1, Above "* cited by examiner" insert -- OTHER PUBLICATIONS International Application No. PCT/US2022/032367, International Search Report and Written Opinion mailed on October 11, 2022, 11 pages. --, therefor.

In the Specification

In Column 20, Line 9, delete "gaining" and insert -- gaming --, therefor.

In Column 26, Line 13, delete "may nm" and insert -- may run --, therefor.

In Column 28, Line 9, delete "may nm" and insert -- may run --, therefor.

In Column 30, Line 3, delete "moderns." and insert -- modems. --, therefor.

In Column 30, Line 32, delete "UNIX" and insert -- UNIX® --, therefor.

In Column 31, Line 8, delete "Byway" and insert -- By way --, therefor.

In the Claims

In Column 34, Line 35, in Claim 1, delete "trans action" and insert -- transaction --, therefor.

Signed and Sealed this
Sixteenth Day of December, 2025

John A. Squires
*Director of the United States Patent and Trademark Office*